United States Patent [19]
Jackson et al.

[11] Patent Number: 6,026,855
[45] Date of Patent: Feb. 22, 2000

[54] FUEL TANK ONE-WAY FLOW VALVE QUICK CONNECTOR

[75] Inventors: Tim Jackson, Lake Orion; Gary Klinger, Warren; John Horst, Sterling Heights, all of Mich.

[73] Assignee: ITT Manufacturing Enterprises, Inc., Wilmington, Del.

[21] Appl. No.: 08/991,505

[22] Filed: Dec. 16, 1997

[51] Int. Cl.[7] .................................................. F16K 15/14
[52] U.S. Cl. ...................... 137/592; 137/515.5; 137/528; 137/512.15; 285/321
[58] Field of Search .................................. 137/511, 515, 137/515.3, 515.5, 528, 535, 533.19, 533.31, 592, 512.15, 540; 251/144, 147; 285/321, 305

[56] References Cited

U.S. PATENT DOCUMENTS

| | | | |
|---|---|---|---|
| 2,710,763 | 6/1955 | Gilbert | 285/321 |
| 2,966,371 | 12/1960 | Bruning . | |
| 3,103,341 | 9/1963 | Moran | 251/144 |
| 3,687,161 | 8/1972 | Grguric et al. . | |
| 5,102,313 | 4/1992 | Szabo . | |
| 5,275,443 | 1/1994 | Klinger . | |
| 5,277,402 | 1/1994 | Szabo . | |
| 5,478,046 | 12/1995 | Szabo . | |
| 5,542,712 | 8/1996 | Klinger et al. . | |
| 5,542,716 | 8/1996 | Szabo et al. . | |
| 5,660,206 | 8/1997 | Neal et al. . | |
| 5,718,459 | 2/1998 | Davie et al. | 285/321 |

FOREIGN PATENT DOCUMENTS

0 864 456  9/1998  European Pat. Off. .

*Primary Examiner*—Kevin Lee
*Attorney, Agent, or Firm*—Robert P. Seitter

[57] ABSTRACT

A one-way flow valve quick connector is used in automotive fuel tank filler systems to interconnect the fuel filler tube with the fuel tank without the use of tools or special equipment. The quick connector includes a check valve to establish a substantially hermetic seal between the tank and the environment at all times to prevent the escape of liquid fuel during the refueling process as well as the escape of toxic vapors. A bypass vent operates during the refueling process to draw any vapors escaping from the tank or entering through the fuel fill tube inlet, filtering and returning them to the fuel tank.

31 Claims, 5 Drawing Sheets

FUEL TANK ONE-WAY FLOW VALVE QUICK CONNECTOR

CROSS-REFERENCE TO RELATED APPLICATIONS

The present invention is related to U.S. Pat. No. 5,542,716, issued Aug. 6, 1996, entitled "Quick Connector With Snap-On Retainer" and U.S. patent applications Ser. No. 08/839,155, filed Apr. 23, 1997, entitled "Quick Connector With Snap-On Retainer Having Enhanced Engagement" and Ser. No. 08/581,102, filed Dec. 29, 1995, entitled "Improved Radial Release Quick Connector" having the same Assignee of Interest as this application which are hereby incorporated within this specification by reference.

INTRODUCTION

The present invention relates to fluid connectors and, more particularly, to quick connectors which are employed in fluid conduit systems to facilitate assembly and disassembly and, more particularly still, quick connectors which include integral check valves which are suitable for fuel tank filler system applications.

BACKGROUND OF THE INVENTION

Quick connect couplings have been widely used in the U.S. automobile industry for many years. Although applicable in numerous applications, quick connectors are most typically employed in fuel delivery systems and vapor recovery systems. The simplest and most cost effective design is the plastic housing female type quick connector releasably mated to a metal male tube end form. The opposite end of the female housing most typically defines a stem having a number of axially spaced barbs formed on the outer circumferential surface thereof and a nylon or resilient plastic tubing end form pressed thereover. Such an arrangement is described in U.S. Pat. No. 5,542,712, issued Aug. 6, 1996, entitled "Quick Connector Housing With Elongated Barb Design".

Although suitable for use in their intended applications, the aforementioned connectors are typically used to connect fluid lines that have small diameters and low pull-off requirements. One example of such a quick connector is known as an interference-type connector. This type of connector has expandable fingers mounted in a housing that create a mechanical interference on an upset portion or bead formed on the tube to be connected. The tube and upset are inserted into the connector housing past the expandable fingers. The fingers expand to allow the upset to pass and then retract behind the upset retaining the tube in the housing. The retention or pull-off force, i.e. the force required to pull the tube out of the housing is dependent upon the rigidity of the expandable fingers. Stated another way, the retention force of the interference type connector is determined in large part by the resistance to expansion of the fingers. If the fingers expand easily to allow insertion of the tube upset, the pull-off or retention force will be low. To get higher retention forces, the fingers have to be more rigid, making insertion of the upset more difficult. Additionally, fingers that are more rigid are more difficult to manually expand to remove the tube when removal is desired.

There are many applications which require very high pull-off forces, but low insertion forces. One such application is the connection of the fuel filler neck to the fuel tank of a vehicle. Pull-off forces in excess of 500 lb. are required. Correspondingly, low insertion forces of only about 20 lb. are required. Because of the need for high pull-off forces and low insertion forces, typical quick connectors are unexceptable for connecting fuel filler necks to fuel tanks. They are also unexceptable in other applications requiring high pull-off forces and low insertion forces.

Connection of the fuel filler neck to the fuel tank has historically been particularly problematic. Not only must this connection perform under high pull-off forces, it must be of robust design to sustain system integrity over an extended period of time, under severe environmental conditions and even under vehicle crash impact loads. As a result, the industry typically employs externally applied mechanical clamps interconnecting the filler tube with a flanged fitting mounted to the filler tank.

Such arrangements typically require a relatively high part count and system complexity, requiring significant labor during the manufacturing process. Furthermore, simple, less expensive traditional approaches, such as welding a flanged nipple to the outer surface of a steel tank can promote corrosion and may not meet more rigorous future structural integrity and environmental requirements.

BRIEF DESCRIPTION OF THE INVENTION

It is an object of the present invention to provide a simple and inexpensive yet mechanically and environmentally robust connection between a tube end form and a connector body as well as an assembly that overcomes the shortcomings of the prior art described hereinabove.

The present invention provides a one-way flow valve quick connector which includes a housing having a through passage which is adapted to register with an opening in a fluid container such as a fuel tank wherein the passage extends from a first opening which is adapted to receive a male member such as the fuel filler tube to a second opening for communicating with the container. Secondly, retainer means are provided to effect releasable engagement between the housing and the male member to establish a fluid interconnection therewith. Finally, a fluid flow actuated check valve operates to effect unidirectional fluid flow through the passage. This arrangement has the advantage of a simple and inexpensive quick connector design which is particularly well suited for use in mating a fuel filler tube with a vehicle fuel tank.

In the preferred embodiment of the invention, the quick connector also includes a flange which extends from the housing at a location nearly adjacent the first opening for interconnecting the quick connector with the container. This arrangement has the advantage of locating most of the structure of the quick connector within the host system container or fuel tank.

According to another aspect of the invention, the flange is adapted to provide flexibility in manufacturing wherein it can be pre-applied to the fuel tank, such as, by welding with the quick connector body installed at a later stage of the process or, alternatively, preassembled with the quick connector body for one-step mounting to the fuel tank as a single assembly. Furthermore, the flange and quick connector body cooperate to establish a one-time snap-lock interconnection therebetween. This arrangement has the advantage of permitting simplified assembly of the quick connector within the fuel tank.

In the preferred embodiment of the invention, the check valve includes a valve member disposed for displacement within the through passage between a closed position wherein the valve member contacts a fixed valve seat to an open position to establish open communication therethrough. Furthermore, the valve member has a contoured impingement surface which faces the fuel inlet end of the quick connector. This arrangement has the advantage of sealing the fuel tank to prevent escape of liquid fuel or vapors at all times except when the tank is being actively filled. When fuel flows through the flow tube, it impacts the valve member impingement surface, moving it toward the open position momentarily and then resealing the tank once the refueling process is complete.

According to another aspect of the invention, the quick connector includes guide means which prevent relative lateral and rotationally displacement of the valve member as it traverses between its open and closed positions. This prevents jamming or malfunctioning of the check valve function.

In the preferred embodiment of the invention, a compression spring biases the valve member towards the closed position continuously. Furthermore, the guide means is integrally formed with the housing. This arrangement provides a simple, one piece outer housing which defines a cage which prevents misassembled, loose or failed parts from falling into the fuel tank.

The preferred embodiment of the present invention employs a radial release type retainer to dimensionally minimize the extension of the quick connector body externally of the fuel tank.

In yet another aspect, the present invention includes a generally cylindrical elongated quick connector housing with the interconnecting flange means disposed near one end thereof whereby a first substantial portion of the connector extends within the container and the second minor portion of the connector extends externally in the container. The retainer acts to engage the male conduit with the second portion of the housing. A first bearing surface is located within the through passage generally axially intermediate the first and second housing portions and a second bearing surface is located within the through passage axially spaced from the first bearing surface. The two bearing surfaces allow a slip-fit displacement between the housing and the male conduit while preventing relative radial and rotational displacement therebetween. This arrangement provides for a very robust interconnection between the fuel filler tube and the quick connector body while minimizing its exterior profile dimension.

According to yet another feature of the invention, the flange is constructed of thermoplastic material such as high density polyethylene that is fusible to the fuel tank and the quick connector body is constructed of dissimilar conductive thermoplastic material such as conductive nylon. This arrangement has the advantage of employing material for the flange that is compatible with materials typically used by tank manufacturers and a different material for the quick connector body which provides the structure and rigidity necessary for a robust design. According to still another feature of the present invention, the inventive one-way flow valve quick connector is employed in a fuel tank filler system which includes a substantially closed fuel storage tank, a fill tube having inlet and outlet ends and means for selectively closing the inlet end of the fuel tube. Such inlet end closure means can be a second check valve. This arrangement has the advantage of sealing the fuel filler tube to prevent the escape of vapors therefrom. The filler system can be supplemented with means which operate to vent the filler tube through a charcoal canister and ultimately back into the fuel tank. This arrangement has the advantage of providing a reduced pressure region within the fuel tube so that upon refueling the host vehicle, vapors contained in the fuel tube do not escape to the atmosphere.

These and other features and advantages of this invention will become apparent upon reading the following specification which, along with the drawings, describes and discloses preferred and alternative embodiments of the invention in detail.

A detailed description of the disclosed embodiments makes reference to the accompanying drawings.

DETAILED DESCRIPTION OF THE PREFERRED AND ALTERNATIVE EMBODIMENTS

Figure 1:
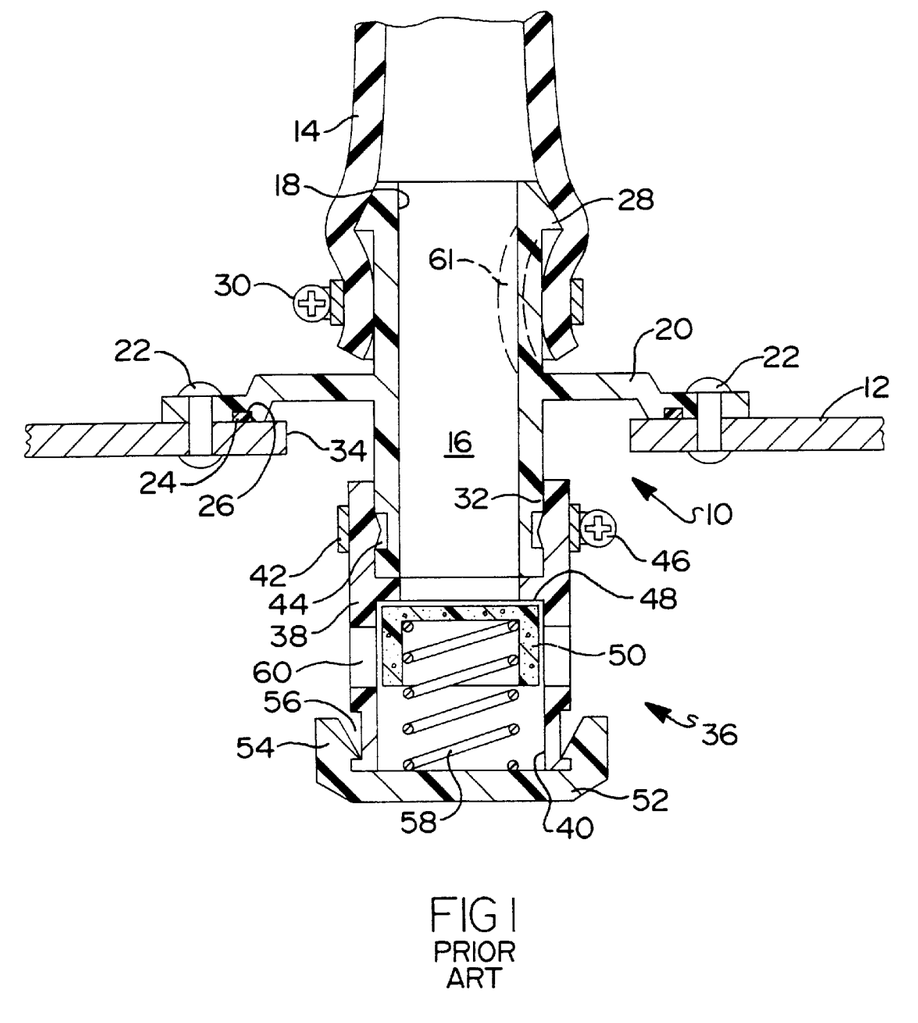
FIG. 1, is a cross-sectional view of a typical prior art fluid inlet connector for automotive fuel tank applications.

Referring to FIG. 1, a prior art connector body 10 depicts a typical interconnection of an automotive steel fuel tank 12 with a rubber fuel fill hose 14. Connector body 10 has an elongated tubular housing 16 defining a through passage 18 constructed of plastic or other suitable material integrally formed with an annular mounting flange 20. Flange 20 is mounted to fuel tank 12 by a plurality of rivets 22 or other suitable fastening means and sealed therewith by an 0-ring 24 disposed in an annular recess 26 in the bottom surface of flange 20.

Housing 18 comprises an upwardly directed barbed nipple 28 mated with fill hose 14 and held in assembly by a mechanical clamp 30.

The lower end 32 of housing 16 extends downwardly through an opening 34 in fuel tank 12. A check valve assembly 36 is attached to lower end 32 of housing 16. Check valve assembly 36 includes a generally cylindrical body 38 having a passage 40 extending therethrough. The I.D. of body 38 is slip-fit over the O.D. of lower end 32 of housing 16 and held in assembly by a combination of a radially inwardly directed rib 42 of body 38 extending within an outwardly opening radial recess 44 formed in the outer peripheral surface of housing 16 adjacent the lower opening of through passage 18. Check valve assembly 36 is further held in place by a mechanical clamp 46.

Passage 40 has a generally central area of reduced diameter forming a valve seat 48 on the lower most surface thereof which operatively engages the uppermost surface of a cup-shaped valve member 50 slidably disposed within passage 40 and operative to substantially close passage 40 when valve member 50 is in contact with valve seat 48. The lower most end of passage 40 is closed by a closure member 52 having a number of engagement tabs 54 which lockingly engage within a radially outwardly opening recess 56 formed in the lowermost portion of body 38. A compression spring 58 acts to bias valve member 50 toward the seated or closed position (illustrated). Radial openings 60 provide for fluid communication between passage 40 and the interior of tank 12.

As is clearly illustrated in FIG. 1, typical prior art connector bodies tend to extend from the fuel tank sufficiently to be susceptible to damage, particularly in crash situations. Furthermore, the complexity of the design includes a high part count which is susceptible to misassembly, multiple failure modes and high cost. Some forms of failure can result in components falling into the tank resulting in disabling of the fuel level measuring apparatus, blocking the fuel outlet line and eliminating the checking function which allows fuel vapor and liquid fuel to backsplash and escape via the fill hose.

Further problems stem from the use of dissimilar materials which can result in corrosion and loosening due to different thermal expansion characteristics. Lastly, some plastic materials previously employed tend to creep or flow over time when subjected to high unit loading. Such creep is illustrated in phantom at 61 and can result in a leakage condition.

Figure 2:
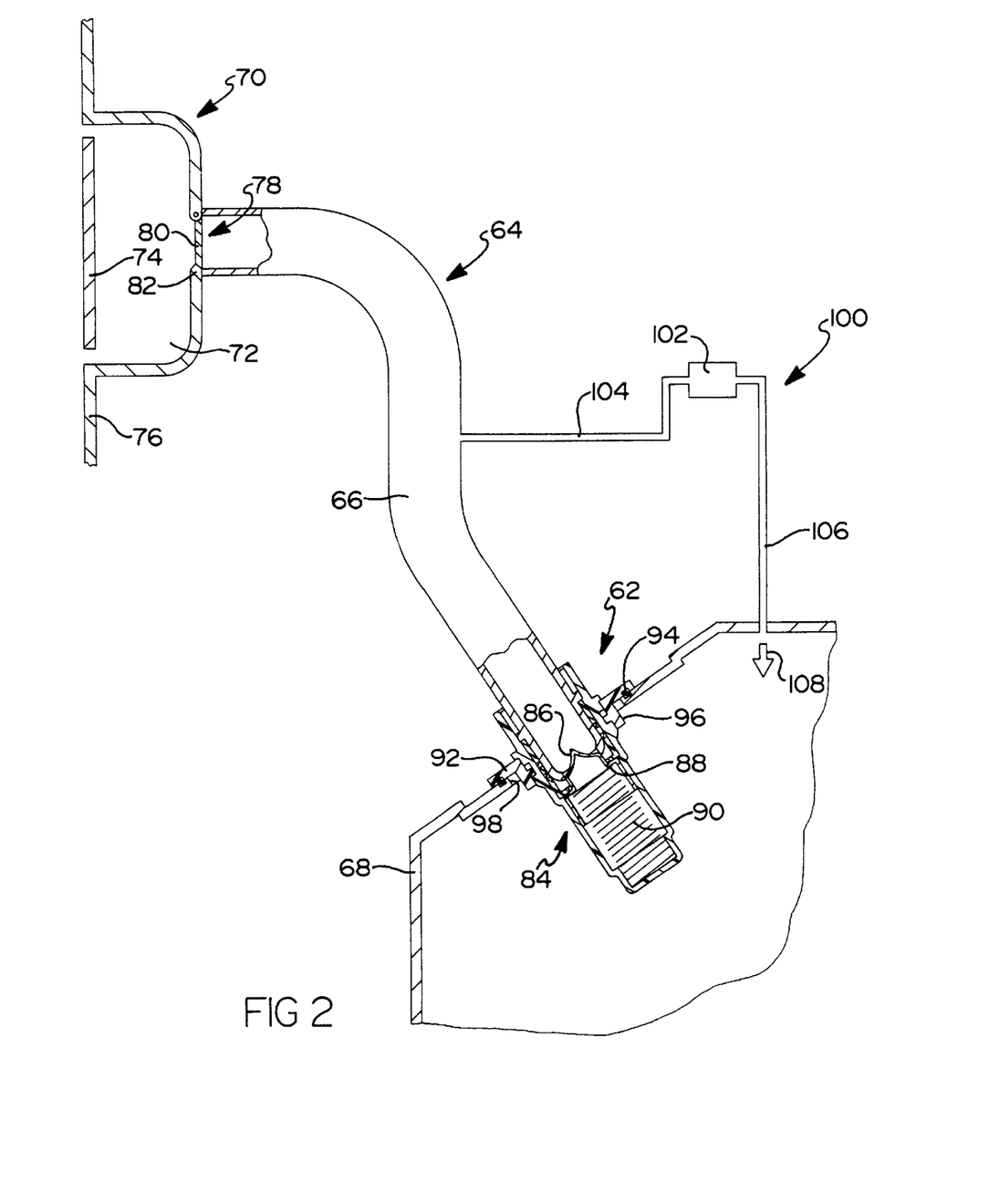
FIG. 2, is a schematic representation of a fuel filling system for an automotive fuel tank employing the present invention.

Referring to FIG. 2, the present invention overcomes many of the shortcomings of prior art devices by employing a quick connector 62 in a fuel tank filler system 64 to interconnect the outlet end of a fuel fill tube 66 with a fuel storage tank 68 of a host vehicle. The inlet end of the fuel fill tube 66 is connected to an externally accessible fuel service port 70 typically including a recess 72 closed by a hinged cover 74 which is part of the host vehicle body 76.

The inlet end of fill tube 66 communicates with recess 72 and is selectively sealed or closed by a first check valve 78 composed of a hinged plate 80 which sealingly engages a fixed seat 82. Plate 80 is held in its illustrated (closed) position by a biasing spring (not illustrated) to prevent the escape of liquid fuel or vapors at all times except when fuel is being added to the system through service port 70.

The preferred embodiment of quick connector 62 includes a check valve 84 including a movable valve member 86 and a fixed valve seat 88 within quick connector 62. A compression spring 90 biases valve member 86 into its closed position in contact with valve seat 88 which prevents fuel or vapor from exiting the tank 68 into fuel fill tube 66 at all times except when fuel is being added to the system 64.

As will be described further hereinbelow, quick connector 62 is attached to the tank 68 by a generally annular flange 92 which is constructed of fusible or weldable material such as high density polyethylene (HDPE) material. HDPE material is selected for its compatibility with the material used to construct fuel tank 68. Ideally, they are constructed from the same material. Flange 92 is joined to tank 68 by fusion, welding, thermo set or spinwelding to establish an annular weldment 94 at the interface therebetween to simultaneously provide a reliable mechanical interconnection as well as a hermetic seal without the need for additional components or processes. Flange 92 includes a hub portion 96 which extends inwardly within tank 68 through an opening 98 therein. Quick connect 62 and hub portion 96 of flange 92 are contoured to provide for one-time snap-lock sealing engagement therebetween without the necessity of tools, gages or other components.

Check valves 78 and 84 act to provide redundant blockage of vapor or liquid fuel under normal operating conditions. In the case of collision damage in which fill tube 66 is severed or vented to atmosphere, check valve 84 can aid to substantially seal fuel tank 86, even in the case where the host vehicle is in an inverted position.

Emissions can be further reduced by the addition of a bypass vent 100 shown schematically to include vapor circulating means such as a pump and a filter, such as a charcoal canister 102 or other means, to draw fuel vapor through an inlet line 104 for discharge back into tank 68 as indicated by arrow 108. This arrangement could be controlled to be actuated continuously or just prior to refueling of the host vehicle wherein pump 102 is energized to create a region of reduced pressure within fuel fill tube 66 whereby when the refueling apparatus (not illustrated) is passed into the inlet of fuel tube 66 opening check valve 78, any vapors within fuel tube 66 will be drawn back into tank 68.

Figure 3:
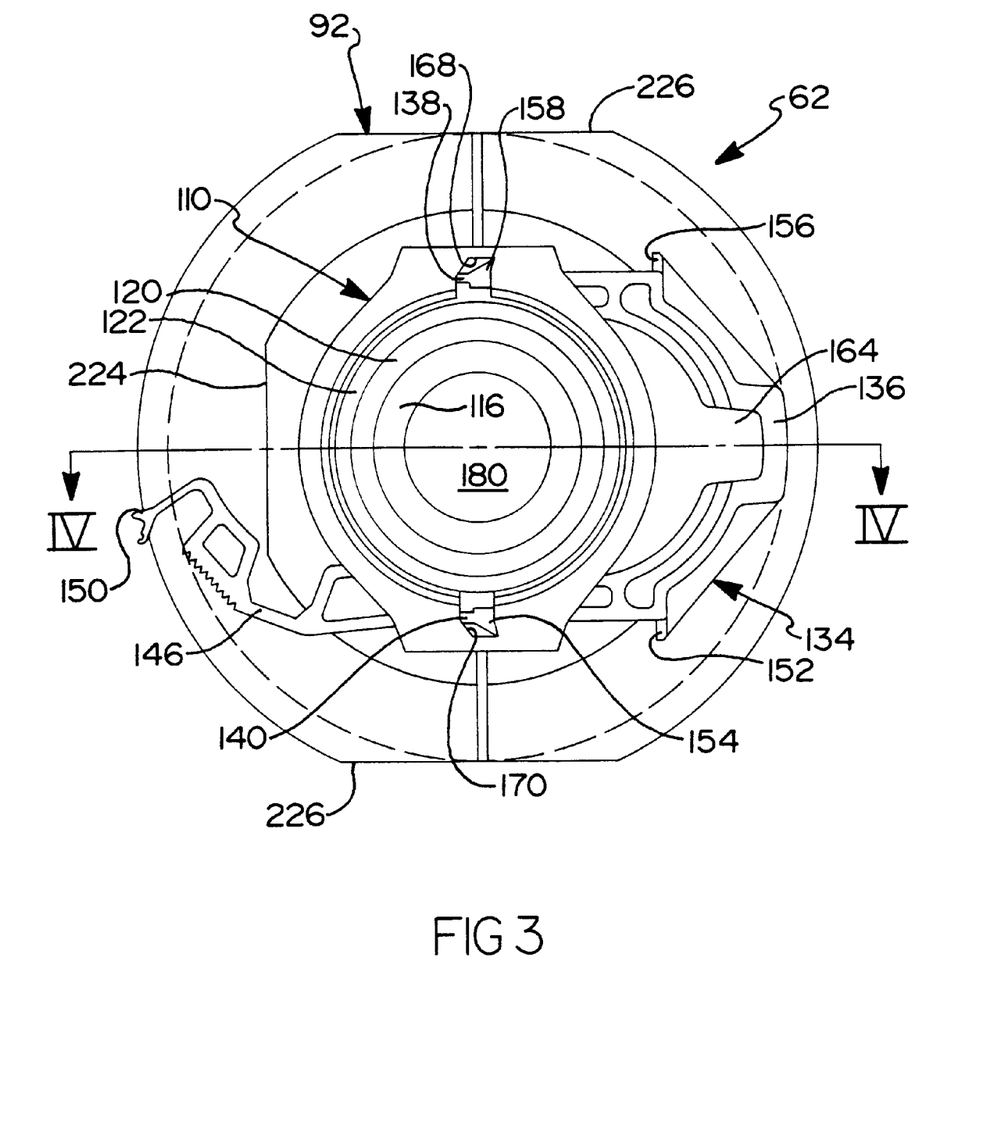
FIG. 3, is an end view, on an enlarged scale, of the preferred embodiment of the present invention for use in the application of FIG. 2.
Figure 4:
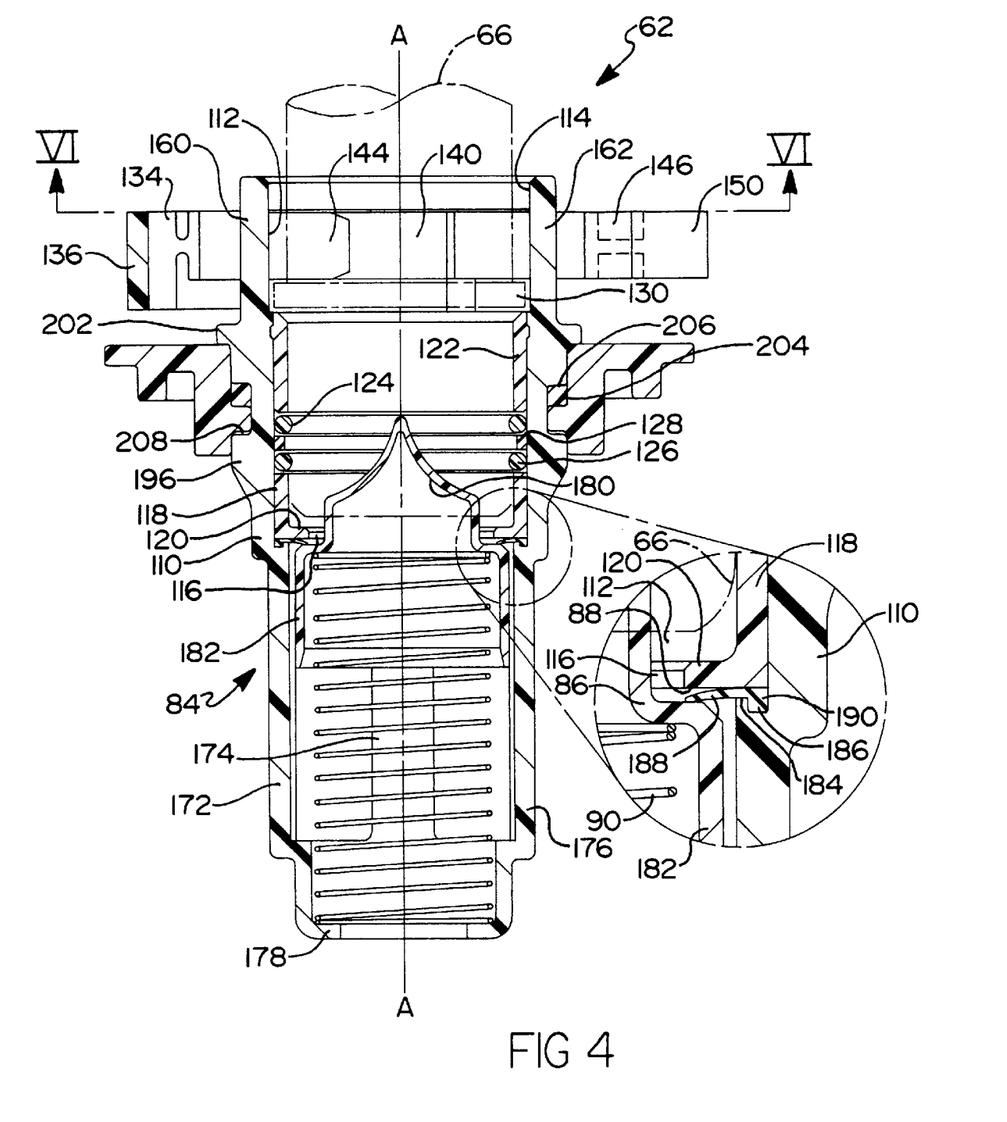
FIG. 4, is a cross-sectional view, taken on line IV—IV of FIG. 3.

Referring to FIGS. 3 and 4, quick connector 62 from fuel tank filler system 64 of FIG. 2 is illustrated on an enlarged scale. Connector 62 comprises a generally tubular elongated housing 110 defining a through passage 112 having an axis of symmetry designated A—A. The uppermost end (as viewed in FIG. 4) of through passage 110 terminates in an opening 114 for receiving the outlet end of fuel fill tube 66 (illustrated in phantom). Through passage 112 extends axially downwardly to a lower terminus or second opening 116 for communicating with the interior of fuel tank 68.

A first nylon spacer 118 is press fit within through passage 112, and includes a radially inwardly directed circumferential flange 120. A second spacer or top hat 122 is also press fit within through passage 112 axially separated from spacer 118. Spacer 118 and top hat 122 define concentric interior cylindrical wall surfaces which are dimensioned to establish a close tolerance, slip-fit relationship with the exterior circumferential surface of the leading end of fuel filler tube 66. Spacer 118 and top hat 122 thus provide bearing surfaces which permit relative axial movement between tube 66 and quick connector 62 but prevent relative radial or rotational movement therebetween. Also disposed within through passage 112 are first and second rubber O-rings 124 and 126, respectively and an intermediate nylon spacer 128. O-rings 124 and 126 serve to establish a redundant hermetic seal between the I.D. surface of connector housing 110 and the outer circumferential surface of fuel fill tube 66.

The uppermost end of top hat 122 defines an abutment surface which serves as a stop/locator for the leading edge of an upset bead 130 formed in fuel fill tube 66.

Figure 6:
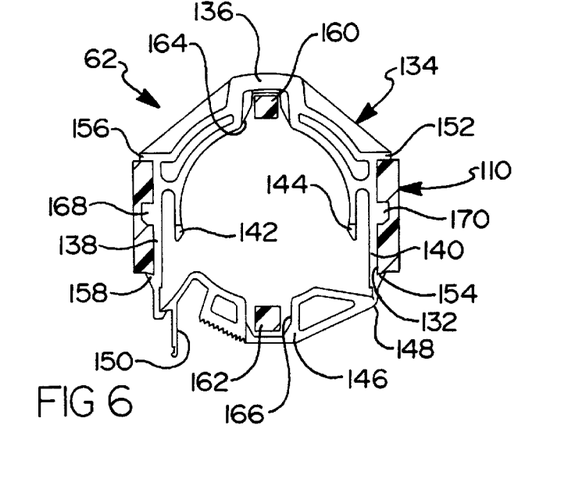
FIG. 6, is a cross-sectional view, taken on line VI—VI of FIG. 4, but with the retainer in the closed and locked position.

Referring to FIGS. 3, 4 and 6, the uppermost end of housing 110 has a generally rectangular passageway 132 radially intersecting through passage 112 at a location near first opening 114. A generally U-shaped retainer 134 is radially slidably disposed within passageway 132 to selectively retain fuel fill tube 66 in the position illustrated in FIG. 4 in an operation that can be completed quickly and without the need for specialized tools. Such snap-on retainers are characterized in U.S. Pat. No. 5,542,716, entitled "Quick Connector With Snap-On Retainer" and U.S. patent applications Ser. No. 08/581,102, filed Dec. 29, 1995, entitled "Improved Radial Release Quick Connector" and Ser. No. 08/839,155, filed Apr. 23, 1997, entitled "Quick Connector With Snap-On Retainer Having Enhanced Engagement", which are owned by the Assignee of Record of the present invention and the specifications of which have been incorporated herein by reference. Accordingly, for the sake of brevity, a detailed description of the structure and operation of retainer 134 will be deleted here for the sake of brevity.

FIGS. 3 and 4 illustrate retainer 134 in its release position in which tube 66 can be removed. FIG. 6 illustrates, in partial section, with tube 66 removed, retainer 134 in the latched or engaged position.

The structural configuration of retainer 134 is best illustrated in FIG. 6, as well as its engagement with housing 110. Retainer 134 is preferably molded of nylon or other suitable thermoplastic material in generally U configuration. Retainer 134 has a base portion 136 and two resilient legs 138 and 140 extending therefrom. The free end of leg 140 has a redundant latch 146 depending therefrom through an intermediate living hinge 148. The free end of redundant latch or retainer 146 forms a catch which engages the free end of the other leg 138 in the closed position to provide redundant retention of tube 66 within housing 110. Resilient curved fingers 142 and 144 depend from legs 138 and 140, respectively, and, in the latched position as illustrated in FIG. 6, would embrace the outer peripheral surface of tube 66 (not shown). Retainer 134 has a series of tabs 152, 154, 156 and 158 which engage surfaces of housing 110 adjacent the openings of passageway 132 to position retainer 134 either in its fully inserted and latched position as illustrated in FIG. 6 or in its open or release position as illustrated in FIGS. 3 and 4. Axially extending reinforcement struts 160 and 162 bisect passageway 132, and extend through recesses 164 and 166 formed in retainer 134 to provide additional structural integrity to quick connector 62. When fully assembled and retainer 134 in a position illustrated in FIG. 6, lube 66 is securely held in place whereby the trailing edge of upset bead 130 is in an abutting relationship with surfaces of base portion 136, fingers 142 and 144 as well as adjoining portions of redundant latch 146 which are collectively distributed circumferentially about tube 66.

Referring to FIGS. 3 and 4, retainer 134 is illustrated in its released position. Radially inwardly opening axial grooves 168 and 170 are formed in housing 110 which engage tabs 158 and 154, respectively, to hold retainer 134 in its illustrated position. After fill tube 66 is fully inserted as illustrated in FIG. 4, retainer 134 is radially repositioned from the position illustrated in FIG. 3 to the position illustrated in FIG. 6 and then redundant latch 146 is rotated clockwise as viewed in FIG. 3 from the position illustrated in FIG. 3 to the latched position illustrated in FIG. 6.

As best illustrated in FIG. 4, check valve assembly 84 is integrated within housing 110 adjacent the second opening 116 of through passage 112 to selectively block fluid flow therethrough. A number of cercumferentially spaced elongated extensions 172, 174 and 176 extend axially (downwardly in FIG. 4) from housing 110, circumscribing second opening 116. The free ends of extensions 172, 174 and 176 terminate in a cup-shaped closure member 178 which is integrally formed with extensions 172, 174 and 176 as well as housing 110 from conductive nylon or other suitable rigid thermoplastic material. Extensions 172, 174 and 176 co-act with closure member 178 to form a cage structure having a generally cylindrical elongated cavity dimensioned to permit the free axial travel of valve member 86 therein. Valve member 86 is generally cup-shaped, having a contoured face portion 180 integrally formed with an annular skirt portion 182. Compression spring 90 reacts in one direction against the uppermost surface (as viewed in FIG. 4) of closure member 178 and oppositely upwardly against the face portion 180 of valve member 86 urging it toward the closed position (illustrated). Spring 90 applies a relatively light force to valve member 86 to keep it in the closed position except for times when fuel is being added to the system 64 through tube 66 and impinges upon face portion 180 of valve member 86 driving it downwardly further compressing spring 90.

Extensions 172, 174 and 176 are dimensioned to provide for relatively long travel of valve member 86, being that it is capable of axial displacement approximately equal to its diameter. This ensures that there will be no restriction upon fluid exiting second opening 116. Face portion 180 is contoured whereby fuel impinging upon face portion 180 will be deflected radially outwardly uniformly about the entire circumference thereof, exiting quick connector 62 through the circumferential spaces intermediate extensions 172, 174 and 176. Such flow characteristics will impart offsetting radial loads on valve member 86 and prevent it from being displaced radially or rotationally. Once a refueling operation is completed, spring 90 will cause valve member 86 to reset against valve seat 88.

As is best viewed in the magnified section of FIG. 4, housing 110 forms a radially inwardly directed step 184 at a location adjacent flange 120 of first spacer 118 and an axially opening circumferential groove 186 is formed in step 184. An annular rubber lip seal 188 is positioned against valve seat 88 to ensure sealing engagement between valve member 86 and valve seat 88. The radially innermost portion of lip seal 188 has a relatively thin flexible section to accommodate slight irregularities in spacing between valve member 86 and valve seat 88 when in the closed position. The radially outermost edge of lip seal 188 has a thickened seal bead 190 disposed within groove 186. When assembled as illustrated in FIG. 4, first spacer 118 abuts the upper surface of seal bead 190 to retain it in its illustrated position while permitting the radially inner most portion of lip seal 188 a degree of axial freedom of movement.

Figure 5:
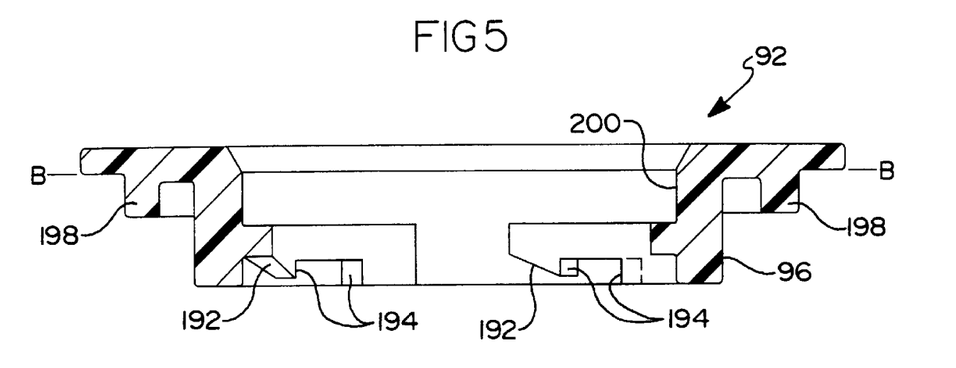
FIG. 5, is a mounting flange, on an enlarged scale, of the flow valve quick connector of FIGS. 3 and 4.

Referring to FIGS. 4 and 5, the structural details of flange 92 are illustrated as well as its interconnection with housing 110. The interior circumferential surface of hub portion 96 of flange 92 has a series of radially inwardly directed ramping and abutment surfaces 192 and 194, respectively, which cooperate with mating tabs 196 integrally formed with and extending radially outwardly from housing 110. Ramp surfaces 192, abutment surfaces 194 and tabs 196 co-act to form a bayonet-type connection which is preferably a one-time snap-lock, preventing subsequent disassembly.

Quick connector 62 is preferably installed in a process including first preassembling it to flange 92 and then attaching flange 92 to the exterior surface of tank 68 by fusion, spinwelding or thermoset welding with hub portion 96 projecting through opening 98 (see FIG. 2) of tank 68. Prior to assembly, a downwardly projecting (as viewed in FIG. 5) annular bead 198 of sacrificial material is integrally formed with flange 92 which, upon welding of flange 92 to tank 68, will melt and commingle with molten material from the surface of tank 68 there adjoining to create weldement 94. When the welding process is complete, the lower surface of flange 92 will be in sealing abutment with the outer surface of tank 68 as indicated by line B—B in FIG. 5.

Before the flange 92 has been secured to the tank 68, quick connector 62 is easily installed by inserting it, check valve 84 end first through an opening 200 formed in hub portion 96 and then rotating housing 110 until tabs 196 interdigitate with ramp surfaces 192 and abutment surfaces 194. At that time, housing 110 is pushed further into tank until an exterior flange 202 extending radially outwardly From housing 110 abuts the uppermost outer surface of flange 92, preventing further inward displacement. In this position, housing 110 and flange 62 have formed an annular concentric recess 206 at the interface therebetween within which is disposed a quad-ring seal 204 of rubber or other suitable material to ensure a hermetic seal is established therebetween. Finally, housing 110 is rotated clockwise (as viewed in FIG. 3) causing the uppermost surfaces 208 of tabs 196 to ramp radially along surfaces 192 of flange 62 until they are engaged by abutment surfaces 194, preventing further relative rotation in either direction. This process is fast, convenient and can be accomplished without the necessity of specialized tooling. Furthermore, no indexing is required between flange 62 and tank 68 or between filler tube 66 and quick connector 62, further simplifying the assembly process.

Figure 7:
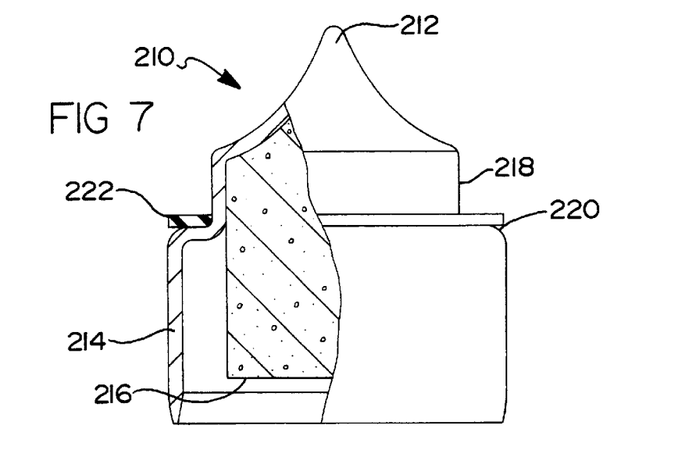
FIG. 7, is a broken, cross-sectional view of an alternative embodiment of a valve member for the present invention.

Referring to FIG. 7, an alternative embodiment of a valve member 210 is illustrated including a face portion 212 integrally formed with a skirt portion 214. A block of buoyant material such as closed cell foam 216 is affixed to an inner surface of face portion 212 of valve member 210 to provide supplemental biasing of valve member 210 against valve seat 88 (see FIG. 4) if liquid fuel within tank 68 submerges that portion of quick connect 62. Buoyant material 216 is spaced from the inner peripheral surface of skirt 214 to provide clearance for spring 90 (not shown in FIG. 7).

Valve member 210 has a cylindrical portion 218, intermediate face portion 212 and skirt portion 214 forming a radial step 220 therebetween. In this embodiment, there is no lip seal in assembly with housing 110. Rather, an annular rubber seal 222 is press fit over intermediate portion 218 to abut step 220. Thus, in application, the check valve seal 222 is carried with valve member 210.

It is to be understood that the invention has been described with reference to specific embodiments in variations to provide the features and advantages previously described and that the embodiments are susceptible of modifications as will be apparent to those skilled in the art. Accordingly, the foregoing is not to be construed in a limiting sense.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims.

What is claimed:

1. A one-way flow valve quick connector comprising:

a housing defining a through passage adapted to register with an opening in a fluid container, said passage extending from a first opening adapted to receive a male member to a second opening for communicating with said container;

a flange extending from said housing near said first opening for interconnecting said quick connector with said container, said flange and said housing cooperating to establish a one-time snap-lock interconnection therebetween;

means to effect releasable engagement between said housing and male member to establish a fluid interconnection therewith; and a fluid flow activated check valve operative to effect unidirectional fluid flow through said through passage.

2. The quick connector of claim 1, wherein said flange is adapted to be weldingly affixed to said container to establish a hermetic seal therebetween.

3. The quick connector of claim 1, wherein one of said openings comprises a fluid flow inlet and the other of said openings comprises a fluid flow outlet.

4. The quick connector of claim 3, wherein said first opening comprises said fluid flow inlet and said second opening comprises said fluid flow outlet.

5. A one-way flow quick connector comprising:

a housing defining a through passage adapted to register with an opening in a fluid container, said passage extending from a first opening adapted to receive a male member to a second opening for communicating with said container, one of said first and second openings comprising a fluid flow inlet and the other of said openings comprising a fluid flow outlet;

means to effect releasable engagement between said housing and male member to establish a fluid interconnection therewith; and a fluid flow activated check valve operative to effect unidirectional fluid flow through said through passage, said check valve comprising a valve member disposed for displacement within said passage from a closed position, wherein said valve member closes said passage upon contacting fixed valve seat within said housing, to an open position to establish communication between first and second openings, said valve member having a contoured impingement surface facing said fluid inlet for non-turbulently directing fluid flow to the fluid flow outlet.

6. The quick connector of claim 5, further comprising guide means operative to substantially prevent relative lateral and rotational displacement of said valve member as it traverses between said open and closed positions.

7. The quick connector of claim 6 wherein said guide means is integrally formed with said housing.

8. The quick connector of claim 5, further comprising a generally annular resilient seal disposed concentrically within said passage to effect fluid tight sealing engagement between said valve member and valve seat when said valve member is in said closed position.

9. The quick connector of claim 8, wherein said resilient seal is disposed adjacent said valve seat.

10. The quick connector of claim 8, wherein sad resilient seal is carried with said valve member.

11. The quick connector of claim 5, further comprising means for urging said valve member towards said closed position.

12. The quick connector of claim 11, wherein said means for urging said valve member towards said closed position comprises a spring.

13. The quick connector of claim 11, wherein said means for urging said valve member towards said closed position comprises a buoyant float.

14. A one-way flow quick connector comprising:

a housing defining a through passage adapted to register with an opening in a fluid container, said passage extending from a first opening adapted to receive a male member to a second opening for communicating with said container;

means to effect releasable engagement between housing and male member to establish a fluid interconnection therewith, said means to effect releasable engagement comprising a radial release retainer; and a fluid flow activated check valve operative to effect unidirectional fluid flow through said through passage.

15. A quick connector adapted for selective locking engagement with a male conduit to establish a path of fluid communication between said male conduit and a substantially closed fluid container, said quick connector comprising;

a generally cylindrical, elongated housing defining a through passage adapted to register with an opening in said container, said passage extending from a first opening adapted to receive said male conduit to a second opening communicating with said container;

means adapted to effect mounting engagement of said housing with said container wherein a first, substantial portion of said connector extends within said container and a second minor portion of said connector extends externally of said container;

means to effect releasable engagement between the second portion of said housing and said male conduit;

first bearing means disposed within said through passage generally axially intermediate said first and second housing portions;

second bearing means disposed within said through passage axially spaced from said first bearing means, said first and second bearing means adapted to permit relative axial slip-fit displacement between said housing and said male conduit while preventing relative radial or rotational displacement therebetween; and seal means disposed within said through passage adapted to effect sealing engagement between an outer circumferential surface of said male conduit and an inner circumferential surface of said through passage.

16. The quick connector of claim 15, wherein said means adapted to effect mounting engagement of said housing with said container comprises a flange constructed of material compatible with that employed in the container.

17. The quick connector of claim 16, wherein said flange is construed of thermoplastic material.

18. The quick connector of claim 16, wherein said flange is constructed of weldable thermoplastic material.

19. The quick connector of claim 16, wherein said flange and housing coact to effect a one-time snap-lock therebetween.

20. The quick connector of claim 16, wherein said flange includes material about the outer circumference thereof to enable establishment of a weldment upon welding interconnection of said flange and container.

21. The quick connector of claim 15, wherein said housing is constructed of thermoplastic material.

22. The quick connector of claim 15, wherein said housing is constructed of conductive thermoplastic material.

23. The quick connector of claim 15, further comprising a fluid flow activated check valve operative to effect unidirectional fluid flow through said through passage.

24. The quick connector of claim 23, wherein said check valve comprises a valve member displaceable within said passage and a fixed valve seat.

25. The quick connector of claim 24, further comprising a lip seal disposed adjacent said valve seat to effect sealing engagement with said check valve, wherein said second bearing means and said valve seat coact to retain said lip seal in place.

26. The quick connector of claim 16, further comprising a resilient seal disposed between said flange and housing.

27. The quick connector of claim 15, wherein said means to effect releasable engagement between said housing and male conduit comprises a radial release redundant retainer.

28. A fuel tank filler comprising:

a substantially closed fuel storage tank;

a fill tube having inlet and outlet ends;

a one-way valve quick connector including:

a housing defining a through passage adapted to register with an opening in said fuel tank, said passage extending from a first opening adapted to receive said filler tube outlet end to the second opening for communicating with said fuel tank;

means to effect releasable engagement between said housing and fill tube to establish a fluid interconnection therewith;

a first fluid flow activated check valve operative to effect unidirectional fluid flow through said through passage; and a second check valve to selectively close the fill tube inlet end.

29. The fuel tank filler system of claim 28, further comprising means operative to vent said fill tube to said fuel tank.

30. The fuel tank filler system of claim 28, further comprising means operative to establish a reduced pressure region within said fill tube.

31. A fuel tank filler system comprising:

a substantially closed fuel storage tank;

a fill tube having inlet and outlet ends;

means to selectively close said inlet end;

a one-way valve quick connector including:

a housing defining a through passage adapted to register with an opening in said fuel tank, said passage extending from a first opening adapted to receive said filler tube outlet end to the second opening for communicating with said fuel tank;

means for effecting releasable engagement between said housing and fill tube to establish a fluid interconnection therewith, said means for effecting releasable engagement of said housing and fill tube comprising a radial release redundant retainer and;

a fluid flow activated check valve operative to effect unidirectional fluid flow through said through passage.

* * * * *